US008793761B2

(12) United States Patent
Chow et al.

(10) Patent No.: US 8,793,761 B2
(45) Date of Patent: Jul. 29, 2014

(54) COGNITIVE PATTERN RECOGNITION FOR COMPUTER-BASED SECURITY ACCESS

(75) Inventors: Stephen Y. Chow, Dallas, TX (US); Grant D. Miller, Arvada, CO (US); Nader M. Nassar, Yorktown Heights, NY (US); Richard J. Newhook, West Chester, PA (US); Erich D. Walls, Valparaiso, IN (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/206,934

(22) Filed: Aug. 10, 2011

(65) Prior Publication Data

US 2013/0042302 A1 Feb. 14, 2013

(51) Int. Cl.
*H04L 29/06* (2006.01)
*G06F 21/36* (2013.01)

(52) U.S. Cl.
CPC ..................................... *G06F 21/36* (2013.01)
USPC ........................................................... 726/3

(58) Field of Classification Search
None
See application file for complete search history.

(56) References Cited

U.S. PATENT DOCUMENTS

| 7,841,940 | B2 | 11/2010 | Bronstein |
| 7,891,005 | B1 * | 2/2011 | Baluja et al. .................... 726/26 |
| 2005/0114705 | A1 * | 5/2005 | Reshef et al. ................. 713/201 |
| 2007/0124595 | A1 | 5/2007 | Carter et al. |
| 2008/0066014 | A1 * | 3/2008 | Misra ............................ 715/846 |
| 2008/0209217 | A1 | 8/2008 | Lamberton et al. |
| 2008/0216163 | A1 | 9/2008 | Pratte et al. |
| 2009/0077629 | A1 | 3/2009 | Douceur et al. |
| 2009/0077653 | A1 | 3/2009 | Osborn et al. |
| 2009/0138723 | A1 | 5/2009 | Nyang et al. |
| 2009/0313694 | A1 | 12/2009 | Mates |
| 2010/0095350 | A1 | 4/2010 | Lazar et al. |
| 2010/0162357 | A1 | 6/2010 | Chickering et al. |
| 2010/0228804 | A1 | 9/2010 | Dasgupta et al. |
| 2010/0318669 | A1 | 12/2010 | Chugh |
| 2010/0325706 | A1 * | 12/2010 | Hachey ............................. 726/6 |
| 2011/0072498 | A1 * | 3/2011 | Li et al. ............................ 726/6 |
| 2011/0081640 | A1 * | 4/2011 | Tseng et al. .................. 434/362 |
| 2011/0150267 | A1 | 6/2011 | Snelling et al. |
| 2012/0084450 | A1 * | 4/2012 | Nagamati et al. ............. 709/229 |
| 2012/0167204 | A1 | 6/2012 | Akka |

OTHER PUBLICATIONS

Ahn, L. et al. (Feb. 2004). Telling humans and computer apart automatically. Communications of the ACM, 47(2), 57-60.
IBM (Oct. 2009). A New Method for Telling Humans and Computers Apart Automatically. IP.com No. IPCOM000188716D. pp. 1-6.
IBM (Jul. 2009). Method and system to generate human knowledge based CAPTCHA. IP.com No. IPCOM000184977D. pp. 1-6.
Chew, M. et al. (2004). Image recognition CAPTCHAs. In Proceedings of the Information Security, Conference (ISC 2004), LNCS 3225, 268-279.
Elson, J. et al. (Oct.-Nov. 2007). Asirra: A CAPTCHA that Exploits Interest-Aligned Manual Image Categorization. ACM, CCS'07, pp. 1-9.

* cited by examiner

*Primary Examiner* — David Pearson
(74) *Attorney, Agent, or Firm* — Cantor Colburn LLP

(57) ABSTRACT

Implementing security access includes receiving a request to perform an activity over a network and administering a cognitive test responsive to the request that includes a set of images and an instruction to identify a cognitive pattern in the set of images. Implementing the security access also includes processing results of the cognitive test, and executing the activity when it is determined from the processing that the cognitive test has been successfully completed.

24 Claims, 3 Drawing Sheets

COGNITIVE PATTERN RECOGNITION FOR COMPUTER-BASED SECURITY ACCESS

BACKGROUND

The present invention relates to computer-based security access, and more specifically, to cognitive pattern recognition for computer-based security access.

Consumers seeking to implement transactions, such as the purchase of items via electronic commerce (ecommerce) applications that include check out processes oftentimes find themselves at a significant disadvantage over competing interests in these items. For example, it is becoming more commonplace for traders to procure large quantities of popular consumer items for the purpose of resale to these consumers by accessing the ecommerce applications using automated software techniques (e.g., pre-formatted scripts or bots) that place orders for the items. As these software techniques operate at very high speeds, they are able to outpace the capabilities of any interested individuals to procure these items, thereby placing these individuals at a great disadvantage.

Many enterprises have adopted security software tools in an attempt to thwart these automated software systems. One popular technique utilizes visually distorted words or alphanumeric characters that are presented to a user and the user is required to enter them in a special field. The distortion seeks to prevent the automated software systems from identifying the words using character recognition technology, thereby discouraging the automated software practices. However, this type of security can be difficult for the consumer as well, since the distortions sometimes have the effect of preventing recognition of the characters even to a human eye. In addition, individuals who are visually impaired would have a particular disadvantage. Furthermore, anti-security techniques for identifying distorted characters have become more improved over time and are able to achieve greater success rates than ever before.

SUMMARY

According to one embodiment of the present invention, a method for implementing security access is provided. The method includes receiving a request to perform an activity over a network, administering a cognitive test responsive to the request that includes a set of images and an instruction to identify a cognitive pattern in the set of images, processing results of the cognitive test, and executing the activity when it is determined from the processing that the cognitive test has been successfully completed.

According to another embodiment of the present invention, a system for implementing security access is provided. The system includes a computer processor and a security application executable by the computer processor. The security application implements a method. The method includes receiving a request to perform an activity over a network, administering a cognitive test responsive to the request that includes a set of images and an instruction to identify a cognitive pattern in the set of images, processing results of the cognitive test, and executing the activity when it is determined from the processing that the cognitive test has been successfully completed.

According to a further embodiment of the present invention, a computer program product for implementing security access is provided. The computer program product includes a storage medium having instructions embodied thereon, which when executed by a computer, cause the computer to implement a method. The method includes receiving a request to perform an activity over a network, administering a cognitive test responsive to the request that includes a set of images and an instruction to identify a cognitive pattern in the set of images, processing results of the cognitive test, and executing the activity when it is determined from the processing that the cognitive test has been successfully completed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to an exemplary embodiment, computer-based security access processes are provided. The security access processes provide a cognitive test over a network to ensure that responses entered are generated by a human as opposed to an automated software application. In receiving a correct answer to the cognitive test, the security access processes presumes that the response has been entered by a human.

The security access processes provide a way of discriminating human involvement in a computer-based transaction that utilizes Internet or network-connected interactions that require an endurance of actual human intervention and not a "pseudo intervention" that could be performed by an automated system or application in the realm of computer technology. Cognitive perception and reaction are performed by the human end user to verify that a human is actually interacting with the information technology system and to verify the intentions of the user initiating the transaction.

In addition, the security access processes may be configured to identify methodical queries of a page for access and deny or block that instance from access to the system (e.g., via the incoming IP address, user name, etc.). These, and other features, of the security access processes will now be described.

Figure 1:
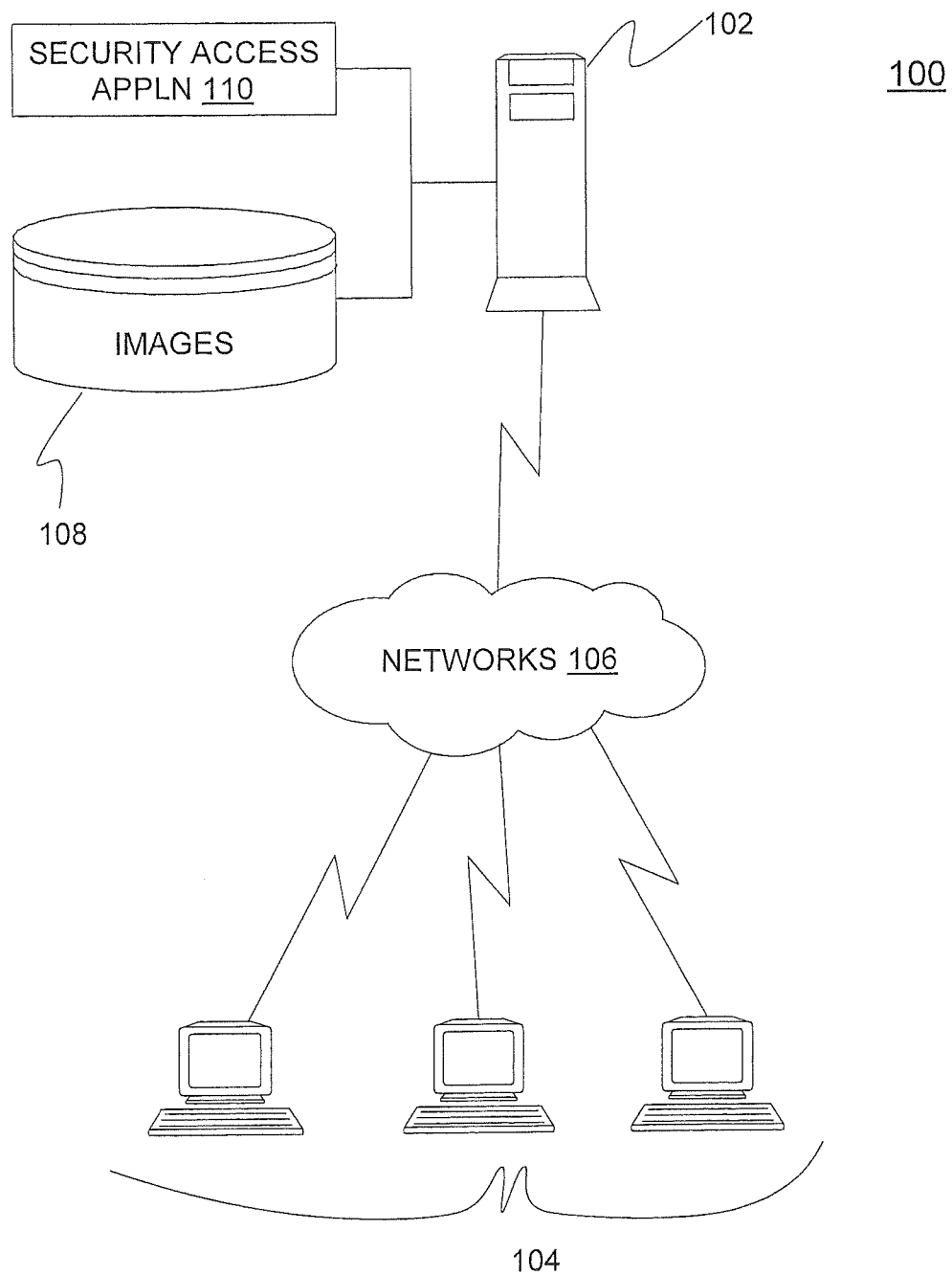
FIG. 1 depicts a block diagram of a system upon which security access may be implemented according to an embodiment of the present invention.

Turning now to FIG. 1, a system upon which the security access processes may be implemented will now be described in an exemplary embodiment. The system 100 of FIG. 1 includes a host system 102 and one or more user systems 104 through which users at one or more geographic locations may contact the host system 102. The host system 102 executes computer instructions for implementing the exemplary security access processes described herein. In one embodiment, the host system 102 represents an enterprise that performs transactions on behalf of users who desire goods or services from the enterprise system. The host system 102 may provide a web site including web pages that offer information regarding goods and/or services, as well as the ability to acquire these goods and services.

The user systems 104 are coupled to the host system 102 via one or more networks 106. Each user system 104 may be implemented using a general-purpose computer executing a computer program for carrying out processes described herein. For example, the user systems 104 may each implement a web browser application. The user systems 104 may be personal computers (e.g., a lap top, a personal digital assistant) or a network server-attached terminal. In an embodiment, the user systems 104 are operated by consumers of goods or services offered via the host system 102.

The networks 106 may include any type of known networks including, but not limited to, a wide area network (WAN), a local area network (LAN), a global network (e.g. Internet), a virtual private network (VPN), and an intranet. The networks 106 may be implemented using a wireless network or any kind of physical network implementation known in the art. A user system 104 may be coupled to the host system through multiple networks (e.g., intranet and Internet) so that not all user systems 104 are coupled to the host system 102 through the same network. One or more of the user systems 104 and the host system 102 may be connected to the networks 106 in a wireless fashion.

The host system 102 is communicatively coupled to a storage device 108. The storage device 108 stores data relating to the security access processes and may be implemented using a variety of devices for storing electronic information. In an exemplary embodiment, the storage device 108 stores instructions and images used in providing the security access processes as will be described herein. It is understood that the storage device 108 may be implemented using memory contained in the host system 102 or it may be a separate physical device. The storage device 108 may be logically addressable as a consolidated data source across a distributed environment that includes networks 106. Information stored in the storage device 108 may be retrieved and manipulated via the host system 102.

In an embodiment, the host system 102 operates as a database server and coordinates access to application data including data (e.g., instructions and images) stored on the storage device 108.

The host system 102 depicted in FIG. 1 may be implemented using one or more servers operating in response to a computer program stored in a storage medium accessible by the server. The host system 102 may operate as a network server (e.g., a web server) to communicate with the user systems 104. The host system 102 handles sending and receiving information to and from the user systems 104 and can perform associated tasks.

The host system 102 may also operate as an application server. The host system 102 executes one or more computer programs to implement the security access processes. As shown in FIG. 1, the host system 102 these computer program (s) are implemented by a security access application 110.

Figure 2:
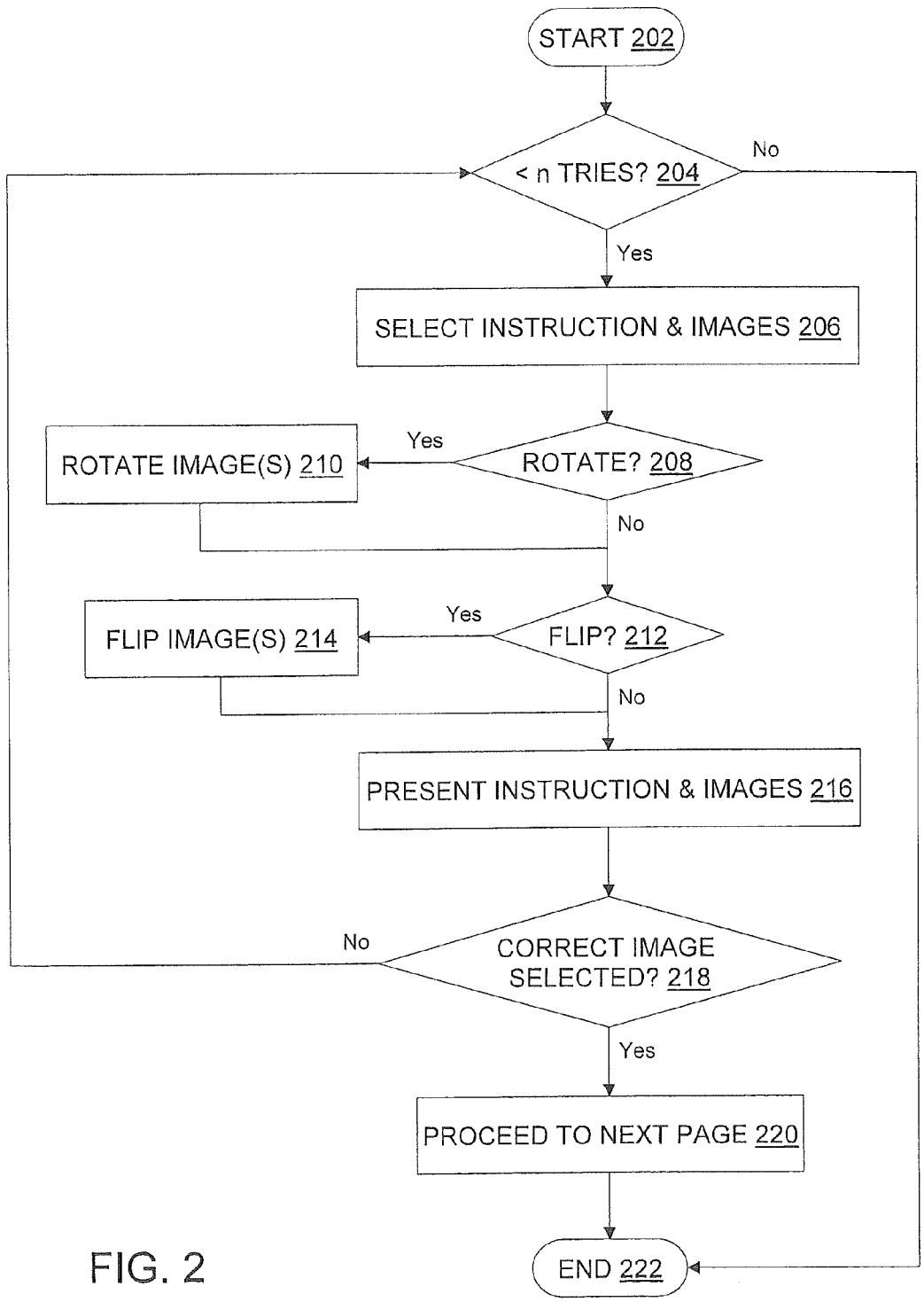
FIG. 2 depicts a flow diagram describing a process for implementing security access according to an embodiment of the present invention.

As indicated above, the security access processes provide a cognitive test over a network to ensure that responses entered are generated by a human as opposed to an automated software application. In receiving a correct answer to the cognitive test, the security access processes presumes that the response has been entered by a human. Turning now to FIG. 2, a process for implementing the security access will now be described in an exemplary embodiment.

The process begins at step 202 whereby a request is received at the host system 102 to perform an activity. In an embodiment, the request relates to a desire to conduct a transaction (e.g., purchase or order goods or services offered by an enterprise of the host system 102). For example, a user may be browsing a web site of the host system 102 enterprise and select goods or services to include, e.g., in a shopping cart at the site or to proceed to a checkout web page. When the user selects an option to purchase or order the goods/services, the security access application 110 receives the request for purchase and proceeds as described herein. Other transactions may include performing a sensitive activity, such as accessing personal or confidential records, downloading software, or registering with an entity for access to information or membership functions.

At step 204, the security access application 110 determines a number of unsuccessful attempts that have been made by the user system 102 at the web site to implement a cognitive test prepared by the security access application 110. If the number of unsuccessful attempts meets a pre-defined threshold number of attempts, the security access application 110 presumes that the source of the requests is an automated software system and may handle the request according to prescribed business logic. In one embodiment, the system may deny the request. The process then ends at step 222.

Otherwise, if the number of unsuccessful attempts does not meet the pre-defined threshold, the security access application 110 administers a cognitive test to the requester at step 206. The security access application 100 accesses the storage device 108 and retrieves an instruction along with an image related to the instruction. The related image refers to an image that correctly answers or provides a solution to the instruction. The security access application 110 also retrieves a set of images that are unrelated to the selected image and instruction. The unrelated images refer to those that do not provide a solution to the instruction. The images may be any representations that are identifiable by a human. The storage device 108 may be configured to the instructions and images using any classification scheme that enables the security access application 110 to identify images related and unrelated to stored instructions. The instruction and image selections may be made at run time (e.g., at the time the request is received).

In an exemplary embodiment, an administrator of the security access processes may configure the security access application 110 to manipulate the images (e.g., the selected or solution image and/or the set of unrelated images). By manipulating the images, the security access application 110 provides an additional layer of security in thwarting the development of anti-security software tools that might store an image repository to identify images in a security system. At step 208, the security access application 110 determines whether the administrator has opted to rotate the images. If so, the security access application 110 rotates the images a specified number of degrees, which number may be configured and dynamically altered by the security access application 110 or by the administrator at step 210.

If the administrator has not opted to rotate the images, or alternatively, if the images have been rotated (from step 210), the security access application 110 determines whether the administrator has opted to flip the images at step 212. If so, the security access application 110 flips the images (e.g., with respect to an axis), such as left to right, right to left, up/down, or down/up at step 214. If the administrator has not opted to flip the images, or alternatively, if the images have been flipped (from step 214), the security access application 110 displays the instruction and images on a display screen of the user system 104 at step 216.

Figure 3A:
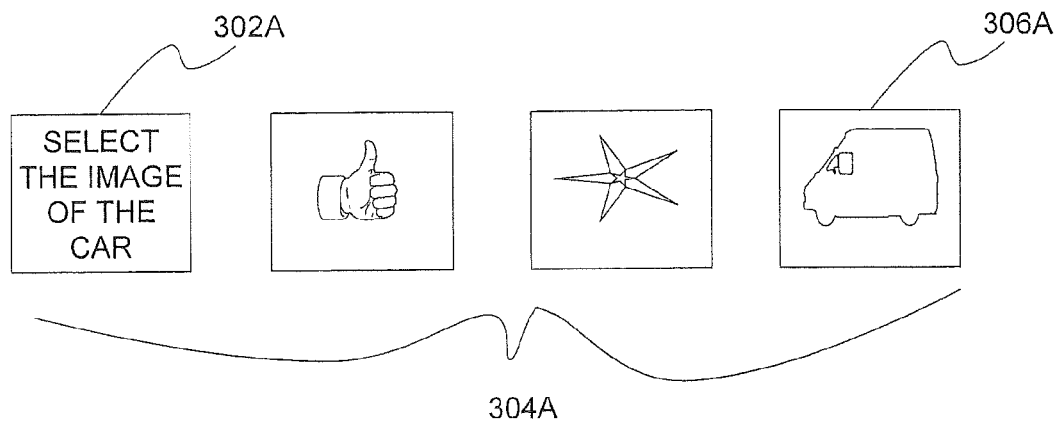
FIG. 3 depicts a user interface screen and sample data provided by the security access system according to an embodiment of the present invention.
Figure 3B:
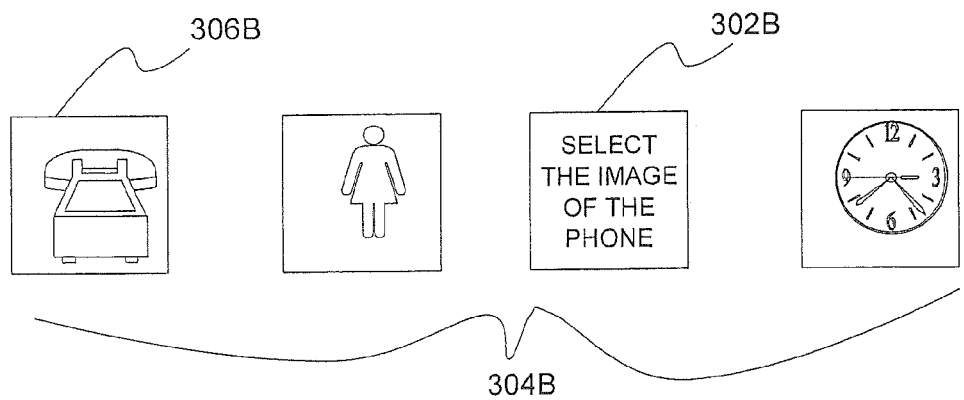

A user interface screen is shown in FIGS. 3A and 3B with sample data. As shown in FIG. 3A, e.g., an instruction image 302A is displayed that directs the user to select a particular image (i.e., the vehicle) from a set of images 304A. The related image in this example is a car 306A and the remaining images refer to the unrelated images selected from the storage device 108. As shown in FIG. 3B, e.g., an instruction image 302B is displayed that directs the user to select a particular image (i.e., a phone) from a set of images 304B. The related image in this example is a telephone 306B and the remaining images refer to the unrelated images selected randomly from the storage device 108. In an exemplary embodiment, as shown in FIGS. 3A and 3B, the security access application 110 may be configured to align the instruction image and the set of images along an axis, and configure the instruction images 302A and 302B and the related of images 306A and 306B to be the same size as the other images 304A and 304B, respectively, in the sets. This alignment and common sizing of the images may assist in preventing automated systems, such as spiders, from learning that images of certain sizes or pixel numbers could be associated with specific items, such as the question image, thereby processing the images differently. The instruction image, related image, and the other unrelated images may be aligned along a common axis (e.g., horizontally or vertically).

At step 218, the security access application 110 determines if the user has selected the correct (i.e., related) image. If not, the user may be instructed to repeat the cognitive test as long as a pre-defined number of attempts have not been reached (step 204) whereby the security access application 110 accesses a new instruction and images for display. In this scenario, the security access application 110 may present an error message to the user. If the correct image has been selected at step 218, the security access application 110 presumes that the requester is a human and permits the user to proceed to the next web page at step 220 (e.g., the shopping cart or checkout page). The process then ends at step 222.

It will be understood that the manipulation options of the images (e.g., rotate, flip) as described in FIG. 2 are provided as non-limiting examples for illustrative purposes. It will be understood that other types of manipulations may be performed on the images, such as random assignment or placement of the images in a sequence displayed to the user, positioning the images in any desired orientation, and/or placement of the images in any space within the web page.

Technical effects of the invention include security access processes that provide a cognitive test over a network to ensure that responses entered are generated by a human as opposed to an automated software application. The security access processes select an instruction and related image from a repository, along with a set of unrelated images, and present the instruction, the related image, and the unrelated images to a user in response to an activity performed over a network. In receiving a correct answer to the cognitive test, the security access processes presumes that the response has been entered by a human. To challenge an automated software application from merely utilizing images in a library to execute the challenge, the security access processes may be configured to modify the orientation, location, and/or order of the images in the set.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing security access, the method comprising:
   receiving a request to perform an activity over a network;
   administering a cognitive test responsive to the request that includes a set of images and an instruction image to identify a cognitive pattern in the set of images, the administering including configuring the instruction image and each of the set of images to be the same size, aligning the set of images along a single axis, and randomly inserting the instruction image among the set of images and along the single axis;
   processing results of the cognitive test; and
   executing the activity when it is determined from the processing that the cognitive test has been successfully completed.

2. The method of claim 1, wherein the set of images include one image related to the instruction image and remaining images in the set are unrelated to the instruction image.

3. The method of claim 2, wherein the cognitive test is successfully completed when the image related to the instruction image is selected.

4. The method of claim 1, wherein the request is for a transaction.

5. The method of claim 1, wherein administering the cognitive test includes manipulating the set of images before presenting the set of images on a display.

6. The method of claim 5, wherein manipulating the set of images includes rotating each of the images a predefined number of degrees.

7. The method of claim 5, wherein manipulating the set of images includes flipping each of the images along an axis.

8. The method of claim 5, wherein manipulating the set of images includes randomly assigning a relative placement of the set of images including the instruction image on the display.

9. A system for implementing security access, the system comprising:
   a central processing unit; and
   a security access application executable by the central processing unit, the security access application configured to implement a method, the method comprising:
   receiving a request to perform an activity over the network;
   administering a cognitive test responsive to the request that includes a set of images and an instruction to identify a cognitive pattern in the set of images, the administering including configuring the instruction image and each of the set of images to be the same size, aligning the set of images along a single axis, and randomly inserting the instruction image among the set of images and along the single axis;

processing results of the cognitive test; and executing the activity when it is determined from the processing that the cognitive test has been successfully completed.

10. The system of claim 9, wherein the set of images include one image related to the instruction and remaining images in the set are unrelated to the instruction.

11. The system of claim 10, wherein the cognitive test is successfully completed when the image related to the instruction is selected.

12. The system of claim 9, wherein the request is for a transaction.

13. The system of claim 9, wherein administering the cognitive test includes manipulating the set of images before presenting the set of images on a display.

14. The system of claim 13, wherein manipulating the set of images includes rotating each of the images a predefined number of degrees.

15. The system of claim 13, wherein manipulating the set of images includes flipping each of the images along an axis.

16. The system of claim 13, wherein manipulating the set of images includes randomly assigning a relative placement of the set of images including the instruction image on the display.

17. A computer program product for implementing security access, the computer program product comprising a non-transitory storage medium embodied with instructions, which when executed by a computer cause the computer to implement a method, the method comprising:
receiving a request to perform an activity over a network;
administering a cognitive test responsive to the request that includes a set of images and an instruction to identify a cognitive pattern in the set of images, the administering including configuring the instruction image and each of the set of images to be the same size, aligning the set of images along a single axis, and randomly inserting the instruction image among the set of images and along the single axis;
processing results of the cognitive test; and
executing the activity when it is determined from the processing that the cognitive test has been successfully completed.

18. The computer program product of claim 17, wherein the set of images include one image related to the instruction and remaining images in the set are unrelated to the instruction.

19. The computer program product of claim 18, wherein the cognitive test is successfully completed when the image related to the instruction is selected.

20. The computer program product of claim 17, wherein the request is for a transaction.

21. The computer program product of claim 17, wherein administering the cognitive test includes manipulating the set of images before presenting the set of images on a display.

22. The computer program product of claim 21, wherein manipulating the set of images includes rotating each of the images a predefined number of degrees.

23. The computer program product of claim 21, wherein manipulating the set of images includes flipping each of the images along an axis.

24. The computer program product of claim 21, wherein manipulating the set of images includes randomly assigning a relative placement of the set of images including the instruction image on the display.

* * * * *